(12) United States Patent
Silvestrini et al.

(10) Patent No.: US 12,017,156 B2
(45) Date of Patent: Jun. 25, 2024

(54) DEAERATOR FOR THE EVACUATION OF GASES IN FLUID BASED HEAT EXCHANGE SYSTEMS

(71) Applicant: ARISTON THERMO S.P.A., Fabriano (IT)

(72) Inventors: Claudio Spuri Silvestrini, Ancona (IT); Flavio Chiavetti, Fabriano (IT); Antonio Lopez, Rome (IT)

(73) Assignee: Ariston S.P.A., Fabriano (IT)

( * ) Notice: Subject to any disclaimer, the term of this patent is extended or adjusted under 35 U.S.C. 154(b) by 532 days.

(21) Appl. No.: 17/237,200

(22) Filed: Apr. 22, 2021

(65) Prior Publication Data

US 2021/0331089 A1    Oct. 28, 2021

(30) Foreign Application Priority Data

Apr. 28, 2020 (IT) .................. 102020000009322

(51) Int. Cl.
  *B01D 19/00* (2006.01)
(52) U.S. Cl.
  CPC ..... *B01D 19/0042* (2013.01); *B01D 19/0063* (2013.01)
(58) Field of Classification Search
  CPC . B01D 19/00; B01D 19/0042; B01D 19/0063
  See application file for complete search history.

(56) References Cited

U.S. PATENT DOCUMENTS 3,174,465 A * 3/1965 Iwamoto ............ B01D 19/0068
                                                    122/459
3,916,991 A * 11/1975 Trump ................ F28D 21/0007
                                                    165/DIG. 441

(Continued)

FOREIGN PATENT DOCUMENTS

EP    2 873 649 A1    5/2015

*Primary Examiner* — Youngsul Jeong
(74) *Attorney, Agent, or Firm* — Shalom Wertsberger; Saltamar Innovations (57) ABSTRACT

Deaerator (1) for the removal and evacuation of gases in heating systems or the like, comprising air expulsion means (2; 4), a container body (10) provided with a cavity (100) inside which a heat transfer fluid passes and circulates, the container body (10) comprising at least one degassing chamber (101), at least one inlet duct (11), wherethrough the heat transfer fluid enters, at least one outlet duct (12), wherethrough the heat transfer fluid exits, the inlet (11) and outlet (12) ducts being in fluid communication with the cavity (100), characterised in that:
  it comprises, inside the cavity (100), at least one flow diverter adapted to divide the flow (F) of the heat transfer fluid into a primary flow (Fp) and into a secondary flow (Fs);
  the flow diverter (14) being positioned in the cavity (100) so as to define, in cooperation with the walls of the cavity (100) and/or of the container body (10), at least the degassing chamber (101), inside which the secondary flow (Fs) passes, and at least one passage chamber (102), inside which the primary flow (Fp) passes, the degassing chamber (101) being dedicated to the interception and evacuation of the air, and the passage chamber (102) being dedicated to the passage of the flow of the heat transfer fluid not subject to degassing;
  the degassing chamber (101) being adapted to slow down the speed of the secondary flow (Fs), by an increase in the passage section, favouring the separation of air from the same flow (Fs).

19 Claims, 6 Drawing Sheets
(2 of 6 Drawing Sheet(s) Filed in Color)

(56) References Cited

U.S. PATENT DOCUMENTS

| | | | |
|---|---|---|---|
| 4,676,308 A | | 6/1987 | Chow et al. |
| 5,085,677 A | * | 2/1992 | Ville ................. B01D 19/0057 96/210 |
| 6,709,500 B1 | | 3/2004 | West |
| 2001/0002596 A1 | * | 6/2001 | Oswald Menu ....... B64D 37/22 137/197 |
| 2018/0028938 A1 | | 2/2018 | Elms et al. |
| 2022/0176275 A1 | * | 6/2022 | Eshelman .......... B01D 19/0063 |

\* cited by examiner

DEAERATOR FOR THE EVACUATION OF GASES IN FLUID BASED HEAT EXCHANGE SYSTEMS

BACKGROUND

The present specification relates to a deaerator for the removal and evacuation of gases from liquids circulating in heating systems or the like.

More in detail, the present specification relates to a deaerator for heat transfer fluids of boilers, burners or the like.

As is known in heating systems, it is necessary to remove the air present in the same system and that circulates with the heat transfer fluid, in order to ensure the correct operation of the system and preserve the reliability of the components, avoiding possible micro-boiling and/or localized overheating phenomena.

Currently, such deaeration function is performed by a suitable valve, colloquially called "jolly valve", installed on the circulating pump.

However, such solution involves limits in the deaeration efficiency and greater design and structural complexity of the same pump that must incorporate, in addition to its essential components, also said jolly valve.

The circulating pump, therefore, has greater overall dimensions and more articulated channels for the passage of the heat transfer fluid which tend to reduce its performance.

Other solutions provide for mounting a deaerator, as an accessory, along the heating system fluid path; above the deaerator, a jolly valve disposed above or on the top portion of the deaerator eliminates the gas that has collected in the deaerator.

In such case, it is still necessary to identify an optimal installation point for the deaerator, in order to ensure the proper operation thereof.

The assembly of such deaerator is also entrusted to the installer with a consequent increase in mounting and commissioning times of the system.

In general, said solutions involve greater bulk of the components, greater system complexity and not always optimal deaeration.

SUMMARY

The object of the present invention is to obviate such kind of drawbacks, by providing a deaerator for the removal and evacuation of gases in heating systems or the like having reduced overall dimensions and capable of operating efficiently.

A further object of the present invention, at least for one or more embodiment variants, is to provide a deaerator installable on boilers, burners or the like.

A further object of the present invention, at least for one or more embodiment variants, is to provide a deaerator that is easily produced and allows easy installation.

BRIEF DESCRIPTION OF THE DRAWINGS

The patent of application file contains at least one drawing executed in color Copies of this patent or patent application publication with color drawing(s) will be provided by the Office upon request and payment of the necessary fee.

Further features of the present invention shall be better highlighted by the following description of a preferred embodiment, in accordance with the patent claims and illustrated, purely by way of a non-limiting example, in the annexed drawing tables, wherein:

DETAILED DESCRIPTION

The features of the deaerator according to a present invention shall now be described using the references contained in the figures.

It is also noted that any dimensional and spatial term (such as "lower", "upper", "inner", "outer", "front", "rear", "vertical", "horizontal" and the like) possibly used below refers, unless otherwise indicated, to the position according to which the object of the invention shown in the drawings is arranged in operating conditions.

In this specification the term deaerator shall mean a device capable of intercepting and evacuating gaseous substances from the heat transfer fluid in which they are dissolved and/or with which they circulate within a heating system.

Typically, said gaseous substances substantially comprise air. Therefore, for brevity, the term "air" shall be equivalently utilized for the gaseous substances, without any limiting intent.

Numeral 1 generally refers to a deaerator.

Said deaerator 1 comprises a container body 10, preferably of cylindrical shape, provided with a cavity 100 inside which a heat transfer fluid passes and circulates.

The container body 10 is provided with at least one inlet duct 11, through which the heat transfer fluid enters, and at least one outlet duct 12, through which the heat transfer fluid exits, said inlet 11 and outlet 12 ducts being in fluid communication with said cavity 100.

Further, the container body 10 may be advantageously provided with a sleeve 13, in fluid communication with the cavity and closed toward the exterior by an appropriate safety valve 130.

According to different possible embodiment variants, the reciprocal position of the inlet 11 and outlet 12 duct may be arranged differently so as to meet multiple installation or application needs.

According to a preferred variant said ducts 11 and 12 may be arranged substantially orthogonal to each other. By way of non-limiting example the inlet duct may be orthogonal to the longitudinal direction of the deaerator, and the outlet duct may be disposed parallel thereto, however it is noted that other angles may be utilized.

Even more preferably, the inlet duct 11 may be disposed along the side wall of the container body 10, while said outlet duct 12 may be disposed on the bottom wall of the container body 10.

According to a further embodiment variant, not illustrated, said ducts 11 and 12 may be arranged both along the side walls of the container body 10, such as arranged one opposite the other, by way of non-limiting example.

Figure 9:
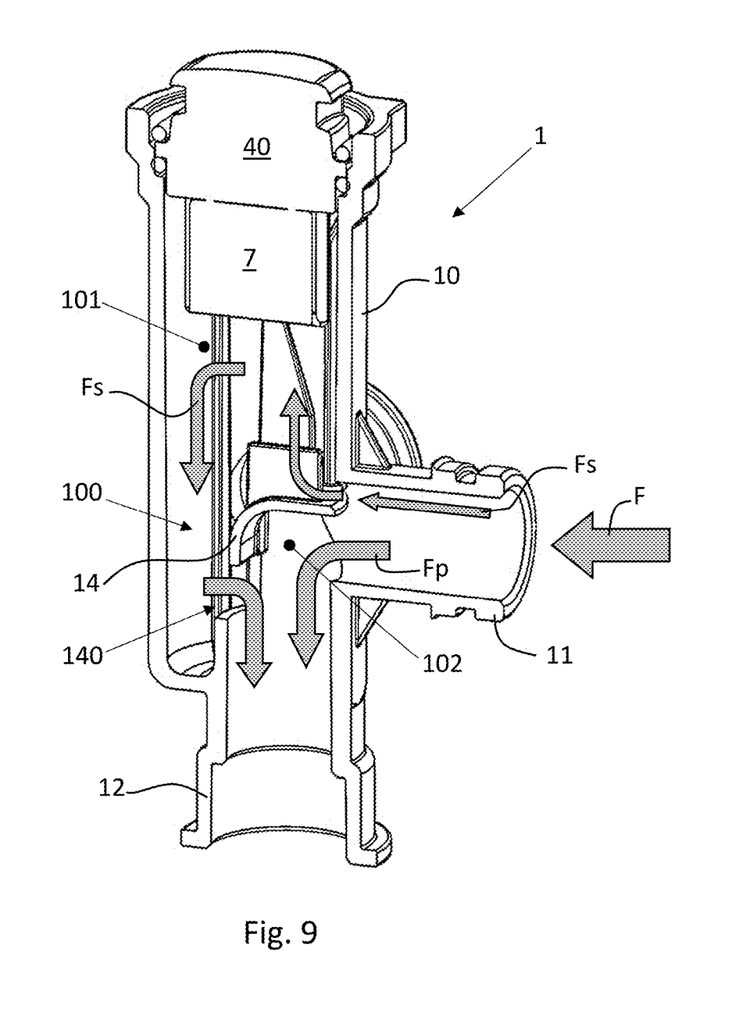
FIG. 9 shows a section view of the deaerator as shown in FIG. 1 showing the flows of the heat transfer fluid passing through the different zones of the said deaerator.

The deaerator 1 is characterised in that it comprises at least one flow diverter 14 which forms a septum positioned to divide the incoming flow F of the heat transfer fluid into a primary flow Fp and into a secondary flow Fs, as shown in FIG. 9.

According to a preferred variant, said flow diverter 14 may be advantageously positioned inside said cavity 100 so as to define, in cooperation with the walls of said cavity 100 and/or of the container body 10, at least one degassing chamber 101, inside which said secondary flow Fs passes, and at least one passage chamber 102, inside which said primary flow Fp passes.

Preferably, the side edges of the said flow diverter 14 may be integral and/or integrated with the walls of said cavity 100 and/or of the container body 10 and/or of the outlet duct 12 and/or with other parts of the deaerator 1.

Basically, the flow diverter 14 divides the cavity 100 into two conceptual parts, one dedicated to the interception and evacuation of the air, i.e. the degassing chamber 101, and the other, i.e. the passage chamber 102 for the passage of the heat transfer fluid flow not subject to degassing, i.e. said primary flow Fp.

It is therefore deduced that the deaerator 1 subdivides the heat transfer fluid flow into two flows Fp and Fs, and only the secondary flow Fs is degassed and deaerated, while the primary flow Fp is reintroduced in the heating system substantially as is, i.e. without having been directly subjected to any degassing or deaeration, after joining with the secondary flow Fs. Notably, minor degassing of the primary flow may also occur, but is considered negligible relative to the degassing of the secondary flow.

In general, the flow diverter 14 may be realised in the form of a septum 14 that, suitably shaped and dimensioned, may extend and develop longitudinally, inside the cavity 100, with at least a first section along the direction of the inlet flow, and optionally a second section disposed generally along the fluid path from the inlet duct 11 to the outlet duct 12.

Figure 10:
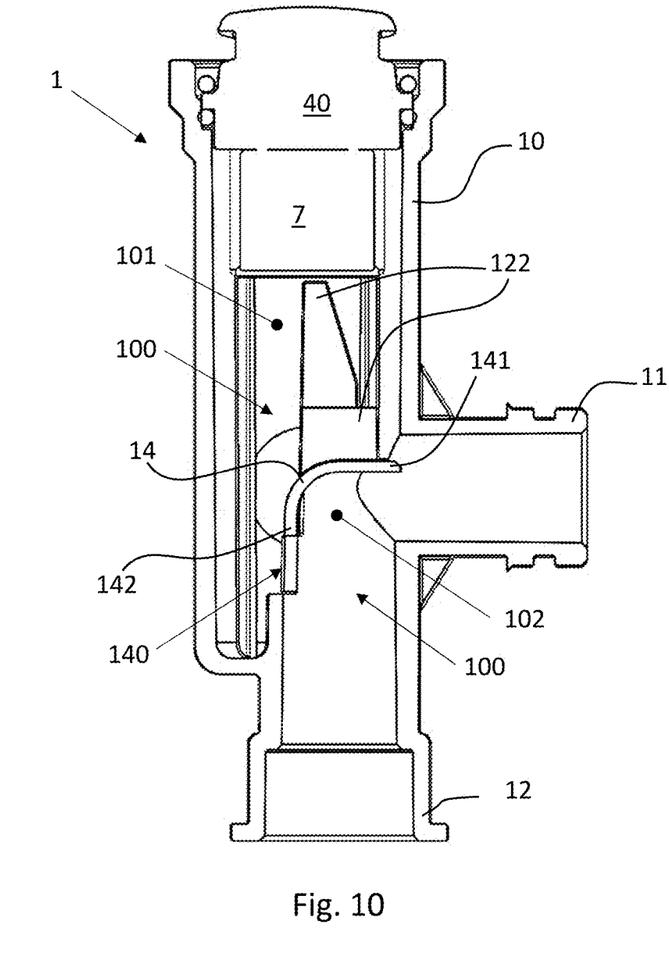
FIG. 10 shows a section view of the deaerator as shown in FIG. 1.

According to a preferred embodiment, with reference to FIG. 10, it should be noted that at least the following is identified of said flow diverter 14:

a first edge 141, also referred to as inlet edge 141, is oriented towards the inlet duct 11, and separates the cavity 100 into the passage chamber, wherethrough the primary flow Fp can pass, and the degassing chamber 101, where through the secondary flow Fs can pass; diverter body laterally coupled to the inner walls of said cavity 100 and positioned to separate said passage chamber from said degassing chamber 101;

an end edge 142, also referred to as discharge edge 142, that is oriented towards said outlet duct 12 forming a merging opening 140 between the degassing chamber 101 and said passage chamber 102 whereby said secondary flow (Fs) joins said primary flow (Fp).

The flow diverter 14, therefore, divides the flow F of the heat transfer fluid into two flows Fp and Fs, and at the same times guides said flows Fp and Fs towards the respective chambers and then towards the outlet duct 12.

With reference to the accompanying figures, in particular to FIG. 9, the path that the flow F and the related flows Fp and Fs take inside the deaerator 1 is better illustrated.

The flow F of heat transfer fluid reaches the inlet duct 11 and passes through it until reaching the coupling section and then cavity 100, where the flow F is divided into two flows Fp and Fs by the flow diverter 14; in particular:

the primary flow Fp, guided by the flow diverter 14, passes through the passage chamber 102 and flows towards the outlet duct 12;

the secondary flow Fs passes through said degassing chamber 101, where the flow becomes turbulent and is slowed down due to the increased cross section and volume of said degassing chamber 101, so as to advantageously release air interned in the secondary flow, after which the secondary flow re-joins with the primary flow through the merging opening 140, and proceeds towards the outlet duct 12.

It is understood that the respective extent of the flows Fp and Fs depends on the position of the flow diverter 14 inside the cavity 100.

For example, such extent may depend on the position of the said diverter 14 with respect to the inlet duct 11, i.e. from its position with respect to the horizontal median plane of said inlet duct 11.

The extent of the flows Fp and Fs correlates with the mutual dimensions of said primary and secondary passages, such dimensions being identified by the position of the flow diverter 14, in particular of its inlet edge 141, with respect to the passage cross section where the inlet edge 141 is positioned.

The deaerator therefore provides for the degasification of only a part Fs of the total flow F of the heat transfer fluid, the proportion of Fs to F being established in the design step by the position chosen for the flow diverter 14 inside the cavity 100, and in particular for its inlet edge 141. It is noticed that other parameters of the flow diverter, such as shape and other flow-directing features may also be utilized.

The deaerator 1, therefore, implements a constant and gradual degasification of the heat transfer fluid, carried out during the operation of the heating system.

The subdivision of the flow F allows processing a fraction Fs of the total flow in order to have, for example:

a compact and suitably sized degassing chamber 101, to the benefit of the total overall dimensions of the deaerator 1;

a degasification improvement, as the focus is on the processing of a fraction Fs of the total flow F, obtaining greater degasification efficiency.

In accordance with a preferred variant, illustrated in the accompanying figures, said deaerator 1 provides that the inlet 11 and outlet 12 ducts may be arranged substantially orthogonal to each other and that said flow diverter 14 may be made with a substantially curvilinear profile capable of dividing the flow F and guiding the flows Fp and Fs towards the respective chambers 101 and 102 and then towards the outlet duct 12.

Optionally, said flow diverter 14 may be made with other shapes or profiles as long as it is capable of dividing the flow F of the heat transfer fluid into two flows Fp and Fs and dividing the cavity 100 into two chambers 101 and 102. By way of example, as an alternative to a curvilinear profile, said flow diverter 14 may be made by joined rectilinear stretches.

Such shapes and profiles may depend on the reciprocal position of the inlet 11 and outlet 12 ducts and/or on the quantity of heat transfer fluid flow to be degassed (flow Fs) and/or on the type of heat transfer fluid and/or on the section and on the shape of the cavity 100.

For example, with reference to the variant in which said inlet 11 and outlet 12 ducts are arranged opposite each other, said flow diverter 14 may be made substantially straight.

Said degassing chamber 101 interacts with the secondary flow Fs in order to enhance the separation thereof and the evacuation of air.

By having an increased cross section for the passage of the secondary flow Fs the degassing chamber 101 is capable of slowing of the speed of the secondary flow Fs, thus facilitating the separation of the air therefrom.

According to a preferred embodiment the inlet edge 141 is positioned relative to the flow passage cross section so as to divide it in two sub cross sections having different areas and specifically where the secondary flow Fs subsection is smaller than the primary flow Fp cross section.

Said degassing chamber 101 may advantageously be provided with at least one turbulator 122 adapted to create turbulence in the secondary flow Fs so as to facilitate formation of micro-bubbles and thus the evacuation of the air.

In accordance with a preferred variant, said at least one turbulator 122 is a septum protruding from said flow diverter 14 from the face towards said degassing chamber 101 and cooperating therewith.

Various shapes and dispositions of turbolators 122 may be utilized, such as by way of non-limiting example, turbulators may be arranged on said walls and/or on said flow diverter 14, and the like.

In the event that the deaerator 1 provides for more turbulators 122, they may be similar to each other or differ from each other in shape and/or size.

Figure 1:
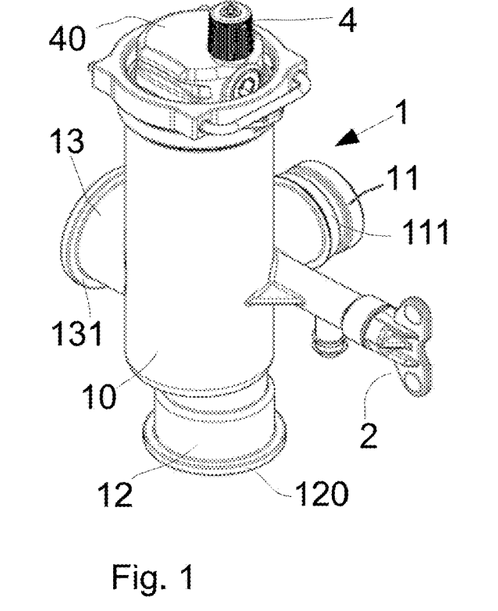
FIG. 1 shows a perspective view of a deaerator according to an embodiment of the present invention.
Figure 2:
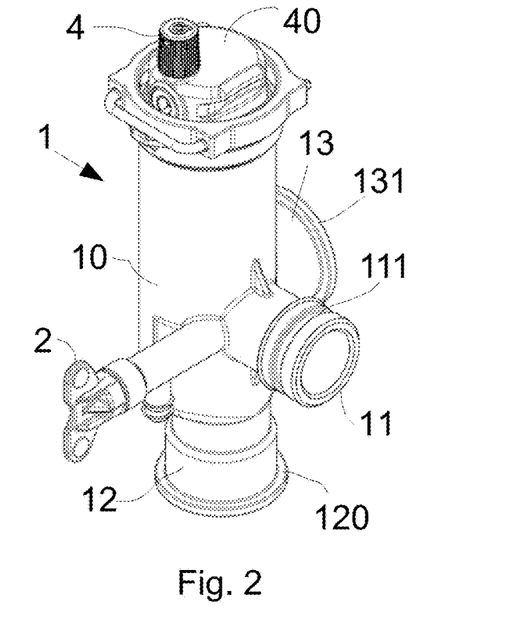
FIG. 2 shows a second perspective view of the deaerator of FIG. 1.
Figure 3:
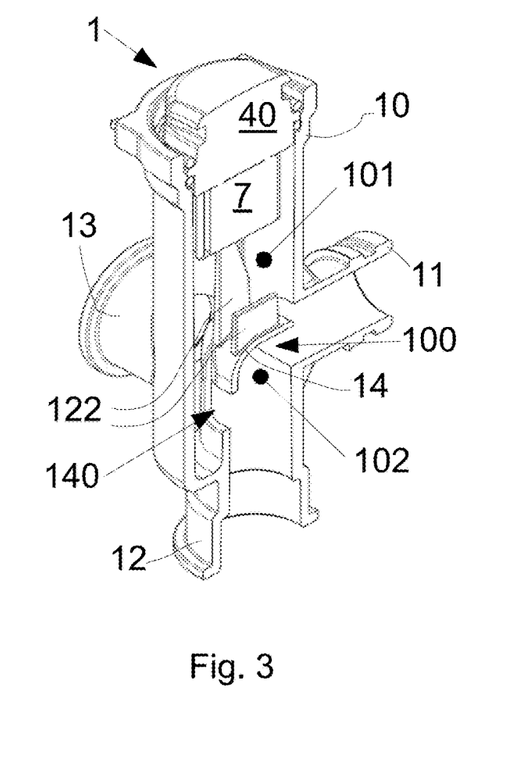
FIG. 3 shows a perspective section view of the deaerator as shown in FIG. 1.
Figure 4:
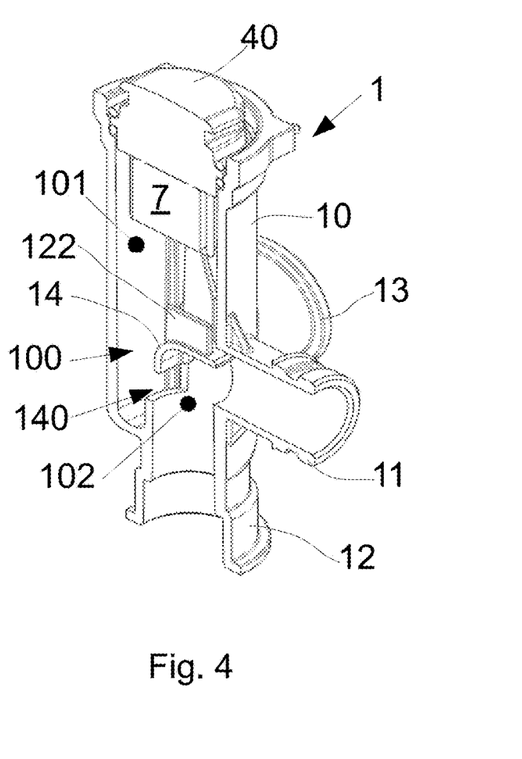
FIG. 4 shows a perspective section view of the deaerator as shown in FIG. 2.
Figure 5:
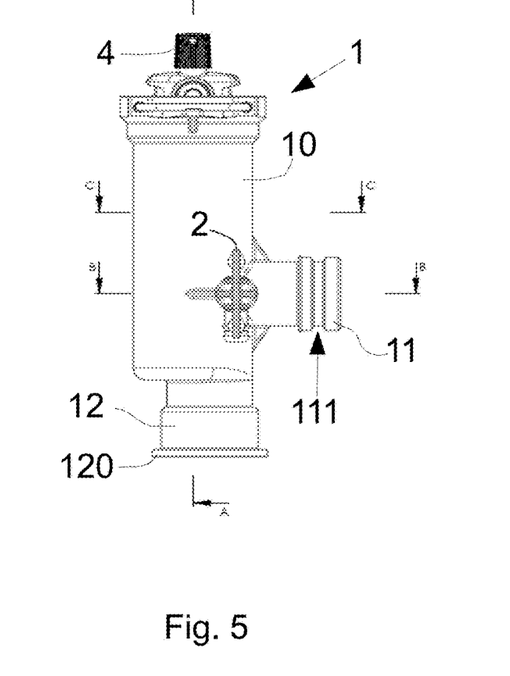
FIG. 5 shows a side view of the deaerator as shown in FIG. 1.
Figure 6:
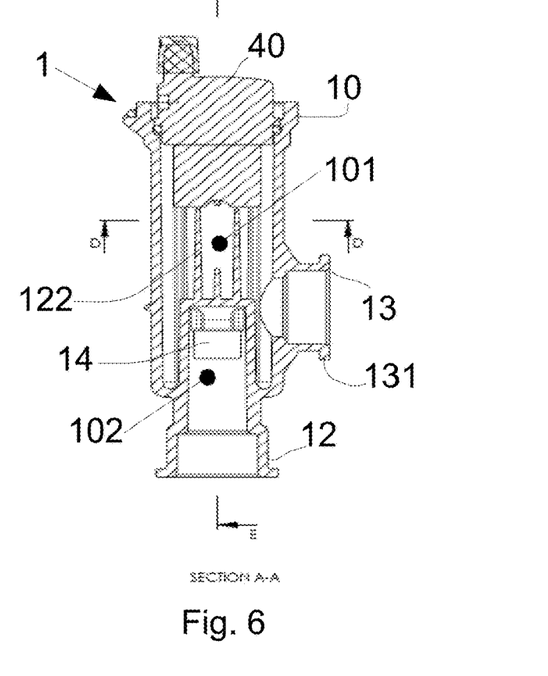
FIG. 6 shows a section view of the deaerator as shown in FIG. 5.
Figure 7:
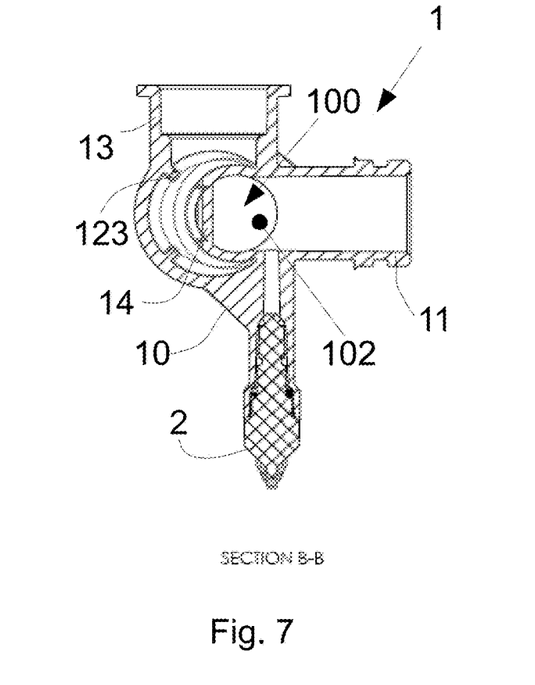
FIG. 7 shows a first section top view of the deaerator of FIG. 5.
Figure 8:
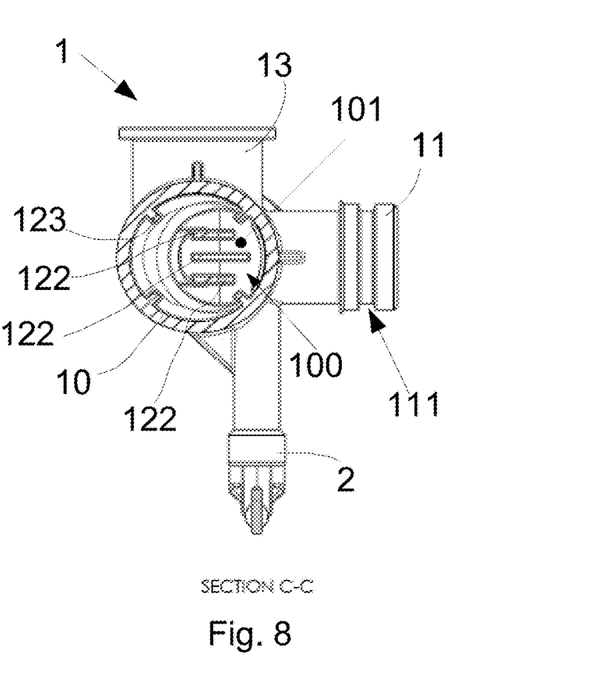
FIG. 8 shows a second section top view of the deaerator of FIG. 5.

In accordance with the variant illustrated in FIGS. 3 and 4, shown by way of non-limiting example, the deaerator 1 comprises three turbulators 122 arranged substantially side by side, where the central turbulator is the lowest while the external turbulators have a vertical development that preferably tapers substantially from the median zone to the top zone of the cavity 100.

Such optional tapering of the external turbulators promotes the turbulent motions in the secondary flow Fs, further improving the degassing process of the same secondary flow Fs.

In general, devices providing air expulsion and capable of evacuating the air collected in the degassing chamber 101 to the outside are advantageously coupled to the deaerator 1.

Said air expulsion devices may include automatic 4 and/or manual 2 bleed valves.

In accordance with a preferred variant, the evacuated air may be automatically removed, for example by an automatic bleed valve 4 advantageously provided with a possible float 7 for activating, according to the prior art, the said automatic bleed valve 4.

As reported in the accompanying figures, in accordance with a preferred variant of the invention, said float 7 cooperates with a cap 40 forming part of the automatic bleed valve 4, said automatic valve 4 serving as a "Jolly" valve".

Said cap 40 is suitably constrained to the container body 10, for example by a joint-wise coupling completed by a seal such as O-rings or the like.

The operation of the automatic bleed valve 4 shall not be further detailed here, being it known to the state of the art and to the man skilled in the art.

Furthermore, the deaerator 1 may also be advantageously provided with a manual bleed valve 2.

Preferably, said bleed valve 2 allows the air bleeding step to be carried out and accelerated during an initial filling step of the circuit of the heating system e.g. upon installation.

In such way, the deaerator 1 allows faster and more effective filling of the heat transfer fluid, allowing the air present in the circuit to exit while filling is carried out.

In accordance with a possible embodiment variant, said at least one turbulator 122 may advantageously cooperate with the float 7 of the deaerator 1, said float 7 allowing the control, i.e. the activation/deactivation, of the automatic air bleeding from the deaerator 1.

In accordance with a preferred variant, said float 7 is slidably placed inside the degassing chamber 101, preferably in its top part.

The turbulator 122 may act as an end stop, for example in the closing step of the automatic bleeding, for the movement of the float 7.

In accordance with a preferred variant, the deaerator 1 may further comprise one or more inner ribs or feathers 123 preferably arranged along the walls of the degassing chamber 101.

Said ribs 123 protruding from said walls may have a more or less pronounced transverse development and may:
  act as additional peripheral turbulators and contribute to further turbulate said secondary flow Fs of the heat transfer fluid;
  define a cylindrical unobstructed volume in which the float 7 can slide along one direction thereby ensuring correct positioning of the said float 7 inside the degassing chamber 101; such function allows the float 7 to be protected from possible accidental impacts during transport of the deaerator 1;
  act as a guide, preferably as a concentric guide, for the sliding movement of the said float 7 inside said degassing chamber 101.

In essence, the float 7 may be arranged among said ribs 123, preferably concentrically with respect to them, so as to be able to slide without substantial interferences or frictions along the same ribs 123.

For such purpose, said ribs 123 may be suitably shaped so as to be geometrically compatible with the geometric characteristics of the said float 7.

In general, therefore, the deaerator 1 according to the present specification allows:
  by utilizing the degassing chamber 101, slowing down the speed of the secondary flow Fs, through the increase of the cross section offered in the passage of the secondary flow Fs, facilitating the separation of the air from the same flow;
  by the one and more turbulators 122, increasing the turbulence of the same secondary flow Fs, further enhancing the formation of micro-bubbles which separate, generally with respect to the larger bubbles, more easily from the heat transfer fluid;

a greater tendency of the micro-bubbles, once leaving and evacuating the fluid, to aggregate with each other and direct towards the upper part of the degassing chamber 101, wherefrom they will then be expelled to the outside.

The air evacuated from the secondary flow Fs, it is collected in the degassing chamber 101, basically in its top part.

In accordance with a preferred variant, the deaerator 1 may be installed directly on the boiler of the heating system.

Even more preferably, the deaerator 1 may be installed in the proximity of the heat exchanger of said boiler, for example in the proximity of the outlet of said heat exchanger, advantageously downstream of the same.

In such way, the deaerator 1 is positioned in the proximity to the hottest zone of the boiler, i.e. close to and/or at the outlet of the heat exchanger.

Due to the high operating temperatures, the heat exchanger mainly enhances the formation of bubbles inside the heat transfer fluid and by positioning the deaerator 1 in such point the deaeration efficiency thereof is increased immediately reducing/eliminating any air bubbles formed inside the same heat exchanger.

Furthermore, in such position the deaerator 1 is even more effective since, due to a high temperature present, the air bubbles are more easily separated from the heat transfer fluid.

This prevents such bubbles, circulating with the heat transfer fluid, from passing through the system, reducing its heating capacity or causing the problems described above.

Moreover, in such way the deaerator 1 may be installed during the assembly and making of the boiler, avoiding its subsequent installation by the installer of the heating system.

Figure 11:
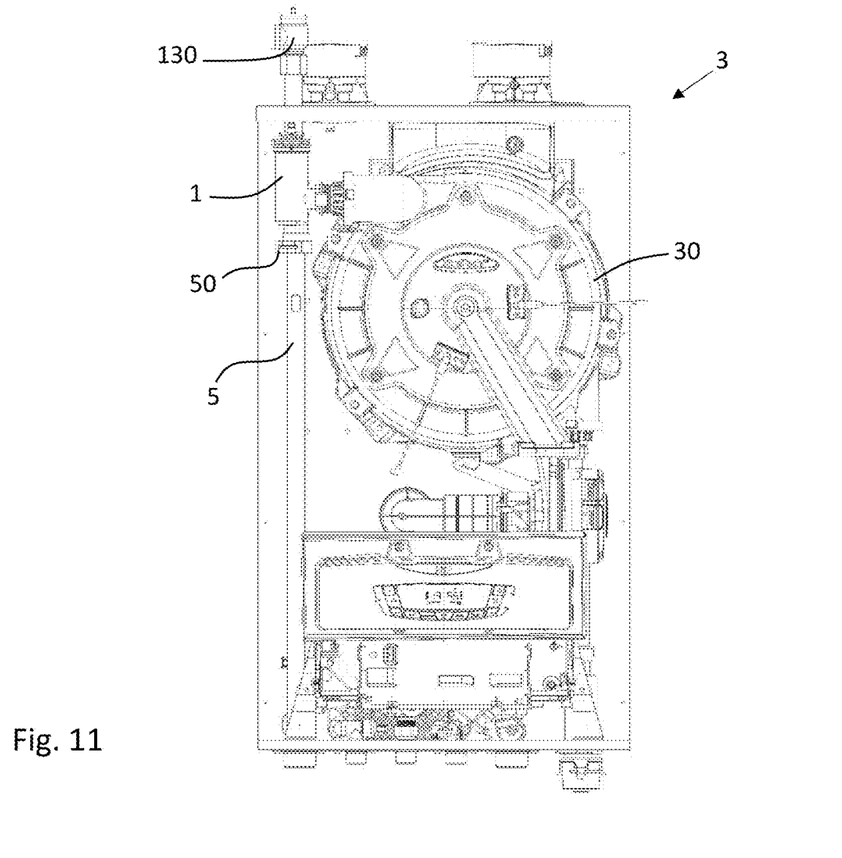
FIG. 11 shows a view of a boiler equipped with a deaerator as shown in previous figures.
Figure 12:
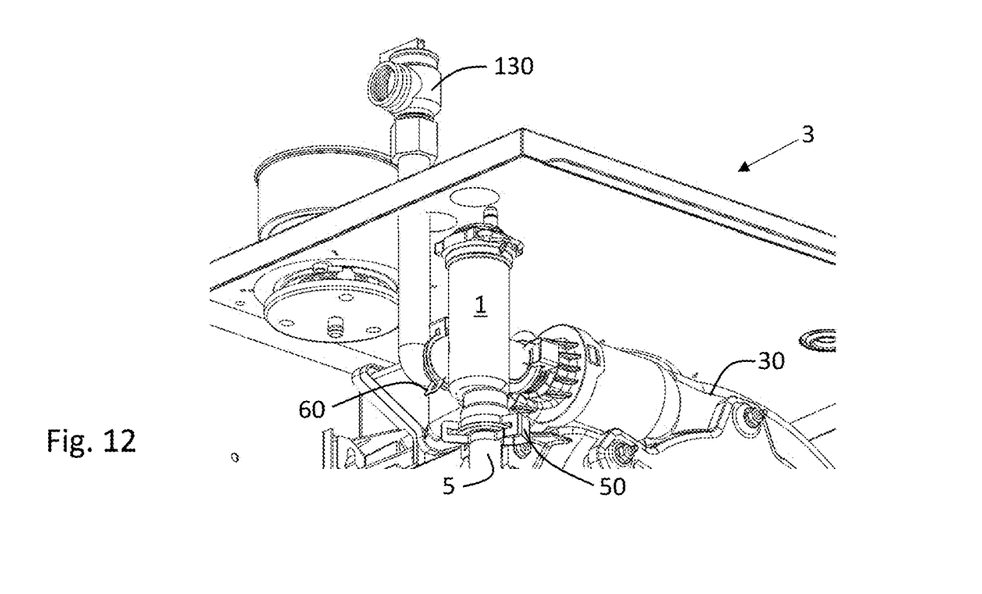
FIG. 12 shows a detail view of the boiler of FIG. 10.

In the variant shown in FIGS. 11 and 12, given by way of a non-limiting example, the boiler 3 is provided with a heat exchanger 30 comprising a spiral-wound pipe wherein the heat transfer fluid circulates.

As can be deduced from FIGS. 11 and 12, the outlet of the heat exchanger 30 is placed in the upper part thereof; in this case the deaerator 1 is in an optimal position to intercept the air and deaerate the heat transfer fluid as:

it is located at the point where the heat transfer fluid has just been heated inside the heat exchanger 30 and could therefore have air bubbles;

it is placed in the upper zone of the exchanger 30, where air generally tends to accumulate.

In accordance with a preferred variant, the inlet duct 11, the outlet duct 12 and, when provided, the sleeve 13 of the deaerator 1, may be respectively connected to the heat exchanger 30, to the delivery pipe 5 of the heating system, and to the safety valve 130 by specific direct connection.

Without any limiting intent, the inlet duct 11 may, for example, be suitably provided with a groove 111 adapted to cooperate with a matching protrusion or with the outlet end of the heat exchanger 30.

The outlet duct 12, instead, may be advantageously equipped with an end collar or edge 120 adapted to cooperate with the fixing collar 50 for the connection to the delivery pipe 5.

Similarly, the sleeve 13 may also be provided with a similar end collar or edge 131 adapted to cooperate with the fixing collar 60 for the connection to the safety valve 130.

Said fixing collars 50 and 60 may advantageously comprise joint-wise metal or plastic clips.

Such arrangement of the deaerator 1 therefore allows direct connection to a heat exchanger and avoids having to equip the circulation pump of the heat transfer fluid with a deaerating device.

In such way, it is possible to improve the performance of the circulation pump which, not being coupled with a deaerator, may advantageously provide for an alignment between its outlet section and the system pipes.

According to the solution proposed by the state of the art, such alignment is not possible as the pump, downstream of the outlet section, must house said deaerator, compromising the realization of such alignment.

The deaerator 1 allows the boilers designer and/or manufacturer to use any type of circulation pump suitable for the purpose.

The deaerator 1 may be made by assembling several parts or made in one piece.

According to a preferred embodiment, said deaerator 1 may be made in one piece by moulding, or similar techniques, advantageously through the use of a single mould.

In such case, once the deaerator 1 body has been formed, it is possible to proceed with the assembly of additional components, such as, for example, the float 7 and/or the automatic bleed valve 4 and/or the manual bleed valve 2.

In accordance with a possible embodiment variant, said deaerator may be produced with plastic materials.

The deaerator 1 may act as a connection between different components of the heating system and/or of the boiler, such as, for example, the heat exchanger, the system delivery, the safety valve 130, and at the same time provides an automatic and/or manual system bleeding/degassing function.

It should be noted that the passages of the deaerator 1 that are crossed by the heat transfer fluid are relatively large and therefore less subject to dirt and/or clogging and/or pressure drops or may facilitate access from the outside, easing the maintenance and/or cleaning of the deaerator 1.

At the same time, the construction compactness of said deaerator 1 allows keeping its overall dimensions reduced, facilitating the integration and installation with any type of boiler, both of domestic and industrial type.

Furthermore, the possible maintenance of the deaerator 1 is also extremely simple, both because it can be easily dismounted and removed, in particular if connected with the "clip" fixing collars 50 and 60 to the boiler components, and because it is easy to clean, even with running water and/or suitable detergent liquids, in all its parts including its ducts 11 and 12 which are advantageously short, compact and therefore easy to reach from the outside.

As already said, the deaerator 1 provides a flow diverter 14 adapted to divide the flow F of the heat transfer fluid into two separate flows, directing them and conveying them to different zones or chambers of the cavity 100, respectively.

The flow diverter 14, therefore defines two chambers but does not create narrow and long channels or ducts. The resultant relatively large chambers reduces pressure drop of the deaerator, ease cleaning, and makes the deaerator 1 less susceptible to deposit of dirt or encrustations.

Consequently, the deaerator 1 is capable of implementing and ensuring a continuous and gradual degassing of the heat transfer fluid, distributed during the operation of the heating system.

Figure 13:
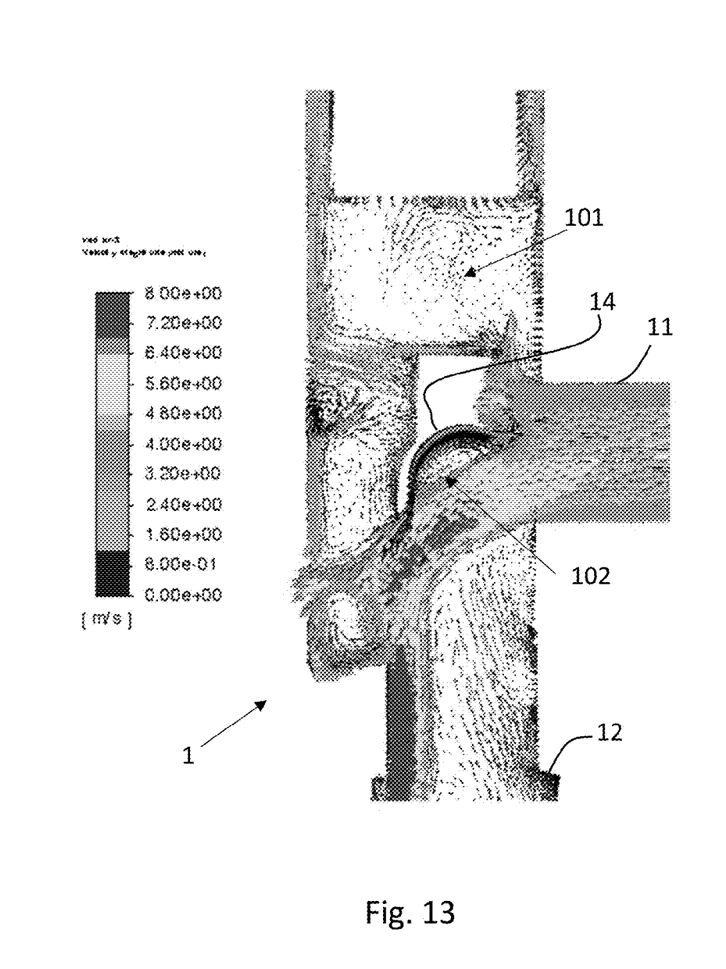
FIG. 13 shows the profile of the speeds of the heat transfer fluid inside the deaerator.
Figure 14:
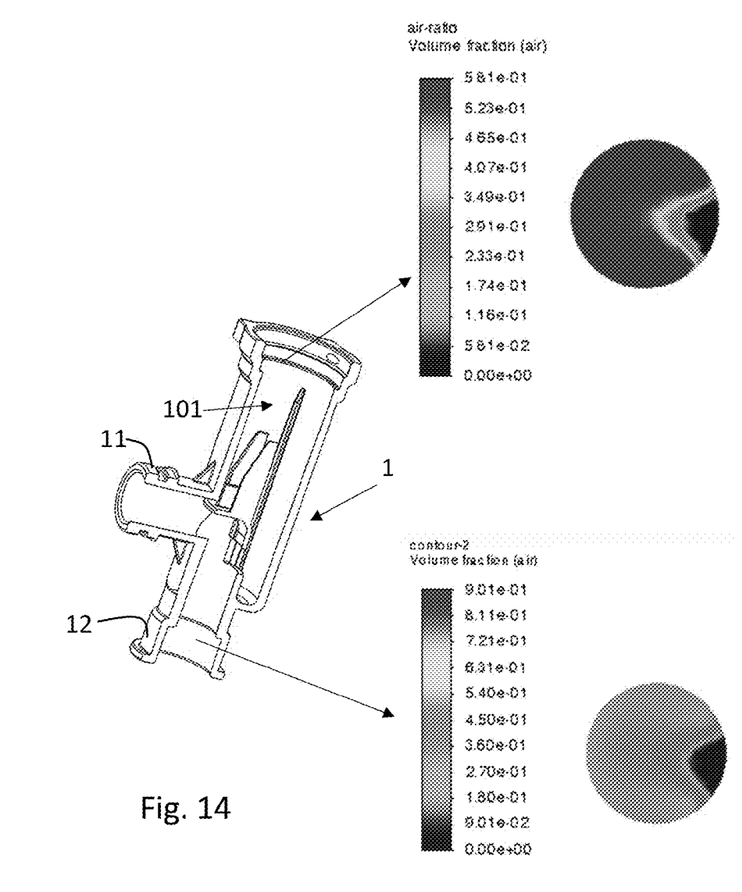
FIG. 14 shows the amount of deaerated air inside the deaerator and accumulated in the top zone of the degassing chamber 101 and the amount of air present in the heat transfer fluid at the deaerator outlet.
Figure 15:
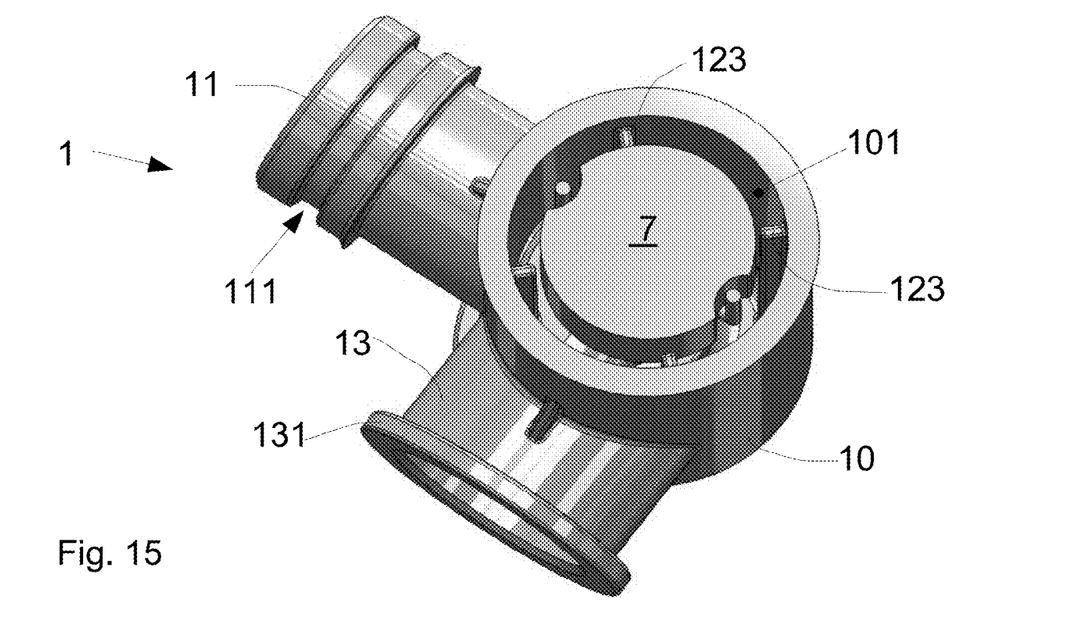
FIG. 15 shows a section view of the deaerator of FIG. 1.
Figure 16:
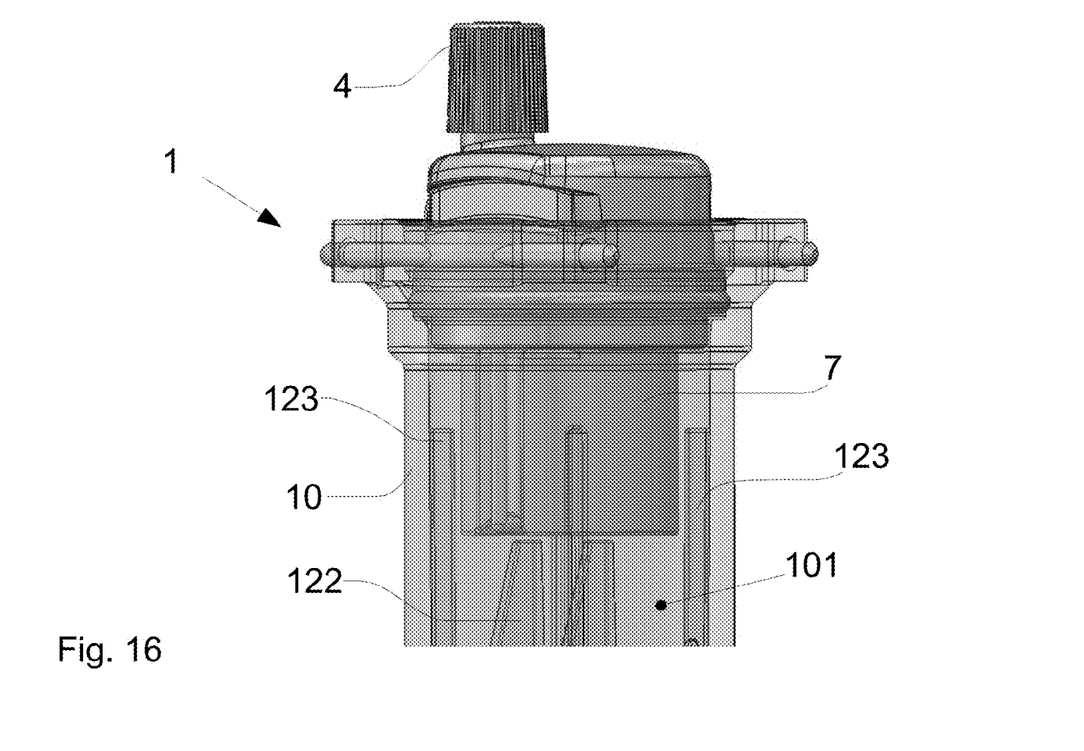
FIG. 16 shows a transparent view of a detail of the deaerator of FIG. 1.

FIGS. 13 and 14 show, by way of a non-limiting example, the experimental results obtained by simulations of the operation of the said deaerator 1.

FIG. 13 shows the speed profiles that the flows Fp and Fs of the heat transfer fluid take inside the deaerator 1 in an exemplary embodiment.

It can be seen from the figure how the secondary flow Fs, entering and passing through said degassing chamber 101, is slowed down, while the primary flow Fp does not undergo substantial speed reductions.

As anticipated, the slowing of the flow Fs is related to the increase in the passage section provided by said degassing chamber 101.

FIG. 14 shows the amount of extracted air inside the deaerator 1 and accumulated in the top zone of the degassing chamber 101 and the amount of air present in the heat transfer fluid at the deaerator outlet during a simulation of the deaerator 1 with the automatic bleed valve 4 closed.

It was found that, in an average residential heating system, after about eight seconds of simulation, the deaerator 1 evacuated about 57% of the air present in the heat-exchange fluid in the system.

FIG. 14 represents the percentages of air detected, after a period of 8 seconds, in the degassing chamber 101, where it is equal to said 57%, and in the outlet duct 12.

Laboratory tests have shown that for an average residential installation, most of the 43% of air remaining after 8 seconds of circulation is advantageously evacuated in about eighty seconds. Such evacuation time is considered negligible for practical purposes.

Such tests have therefore shown that in about ninety seconds for an average residential installation the deaerator is capable of significantly reducing or eliminating the amount of air present inside the heating system.

As already mentioned, such air evacuation takes place gradually during the operation of the said heating system, by processing and deaerating instant by instant a fraction Fs of the heat transfer fluid.

Numerous variants to the embodiments of the deaerator described herein would be clear to a person skilled in the art, without departing from the novelty scopes of the inventive idea, as well as it is clear that in the practical embodiment of the invention the various components described above may be replaced with technically equivalent ones.

For example, nothing prevents from applying the deaerator 1 also to air conditioning systems or in general in all those applications requiring air removal from a liquid and/or a heat transfer fluid.

The invention claimed is:

1. A deaerator for removal and evacuation of gaseous substances from fluid circulating in a fluid based heat exchange system, the deaerator comprising:
 a container body having internal walls defining a cavity within the container body;
 at least one inlet duct in fluid communication with the cavity, for inflowing heat exchange fluid to the cavity;
 at least one outlet duct in fluid communication with the cavity for outflowing heat exchange fluid from the cavity;
 at least one flow diverter disposed within the cavity, the flow diverter in cooperation with the internal walls, dividing the cavity into at least a degassing chamber and a passage chamber;
 the flow diverter having an inlet edge disposed at or adjacent to the inlet duct defining a degassing chamber entry having a cross-section, the degassing chamber having in at least a portion thereof a cross section larger than the cross section of the degassing chamber entry;
 the inlet edge being disposed and oriented to divide heat exchange fluid flow from the inlet duct into a primary flow directed to the passage chamber and a secondary flow directed to the degassing chamber;
 a merging opening between the passage chamber and the degassing chamber, the merging opening disposed distally to the degassing chamber entry along the passage chamber and the degassing chamber, to permit merging of the primary and secondary flows after the respective flow traversed at least a portion of the respective chamber, the merging opening further disposed to permit the merged flow to exit the cavity via the outlet duct; and,
 at least one gas expulsion device in fluid communication disposed in fluid communication with an upper section of the degassing chamber.

2. The deaerator as claimed in claim 1, wherein the gas expulsion device is an automatic gas discharge valve.

3. The deaerator as claimed in claim 1, wherein:
 the deaerator having a length defining a longitudinal direction;
 the outlet duct is fluid coupled to the cavity at or near a bottom section thereof and along the longitudinal direction; and,
 the inlet duct is fluid coupled to the cavity at a side wall thereof, and at an angle relative to the longitudinal direction.

4. The deaerator as claimed in claim 1, further comprising at least one turbulator disposed at least partially within the degassing chamber, and adapted to create a turbulence in the secondary flow.

5. The deaerator as claimed in claim 4, wherein the turbulator comprises a septum protruding from the flow diverter into the degassing chamber.

6. The deaerator as claimed in claim 1, further comprising a float adapted for sliding motion within the degassing chamber, the float being operational to control gas evacuation of gaseous substances captured from the fluid via the gas expulsion device.

7. The deaerator as claimed in claim 6, further comprising at least one inner rib arranged within the degassing chamber along the internal wall, the inner rib dimensioned and disposed for guiding the float sliding motion.

8. The deaerator as claimed in claim 7, wherein the inner rib is disposed to act as a peripheral turbulator.

9. The deaerator as claimed in claim 1, further comprising a safety valve in fluid communication with the cavity.

10. The deaerator as claimed in claim 1, wherein the gas expulsion devices include an automatic bleed valve.

11. The deaerator of claim 1, further comprising a manual valve in fluid communication with the cavity, for facilitating air evacuation during filling of the heat exchange system with fluid.

12. The deaerator as claimed in claim 1 wherein the deaerator is molded as a single piece.

13. The deaerator as claimed in claim 1 wherein the degassing chamber entry is dimensioned and/or disposed to set the primary flow volume to have greater flow magnitude than the secondary flow.

14. The deaerator as claimed in claim 1 wherein:
 the deaerator having a length defining a longitudinal direction;
 the inlet duct is fluid coupled to the cavity at a side wall thereof, and forming an entry angle relative to the longitudinal direction; and
 the flow diverter comprises at least a first portion disposed about the inlet port at substantially similar entry angle of the inlet port, and a second portion disposed substantially parallel with the longitudinal direction.

15. The deaerator as claimed in claim 14, wherein the entry angle is substantially 90°.

16. A fluid based heat exchange system, the system comprising:
- at least a boiler based heat exchangers;
- a fluid circulator operational to circulate heat exchange fluid along a fluid path which includes at least the boiler based heat exchanger;
- a deaerator connected to the fluid path, such that at least a portion of the circulated heat exchange fluid flows therethrough, the deaerator comprises:
- a container body having internal walls defining a cavity within the container body;
- at least one inlet duct in fluid communication with the cavity, for inflowing heat exchange fluid to the cavity;
- at least one outlet duct in fluid communication with the cavity for outflowing heat exchange fluid from the cavity;
- at least one flow diverter disposed within the cavity, the flow diverter in cooperation with the internal walls, dividing the cavity into at least a degassing chamber and a passage chamber;
- the flow diverter having an inlet edge disposed at or adjacent to the inlet duct defining a degassing chamber entry having a cross-section, the degassing chamber having in at least a portion thereof a cross section larger than the cross section of the degassing entry;
- the inlet edge being disposed and oriented to divide heat exchange fluid flow from the inlet duct into a primary flow directed to the passage chamber and a secondary flow directed to the degassing chamber;
- a merging opening between the passage chamber and the degassing chamber, the merging opening disposed distally to the degassing chamber entry along the passage chamber and the degassing chamber, to permit merging of the primary and secondary flows after the respective flow traversed at least a portion of the respective chamber, the merging opening further disposed to permit the merged flow to exit the cavity via the outlet duct; and,
- at least one gas expulsion device in fluid communication disposed in fluid communication with an upper section of the degassing chamber.

17. The system as claimed in claim 16, wherein the deaerator is installed directly on the boiler.

18. The system as claimed in claim 16, wherein the deaerator is installed in the proximity of the boiler based heat exchanger.

19. The system as claimed in claim 16, wherein the deaerator inlet duct is fluid coupled directly to the boiler based heat exchanger, and the deaerator outlet duct is fluid coupled to a delivery pipe which forms a portion the fluid path.

* * * * *